US007116989B2

(12) United States Patent
Mazzara et al.

(10) Patent No.: US 7,116,989 B2

(45) Date of Patent: Oct. 3, 2006

(54) METHOD AND SYSTEM FOR TELEMATIC DEVICE ACTIVATION ATTRIBUTE FORMATION

(75) Inventors: William E. Mazzara, Drayton Plains, MI (US); John S. Ashman, Macomb Township, MI (US); Matthew G. Przybylski, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 618 days.

(21) Appl. No.: 10/198,490

(22) Filed: Jul. 18, 2002

(65) Prior Publication Data

US 2004/0012501 A1 Jan. 22, 2004

(51) Int. Cl.
*H04Q 7/20* (2006.01)

(52) U.S. Cl. .................. 455/456.2; 455/418; 455/419; 455/420; 455/432.3; 340/426.16; 340/426.35

(58) Field of Classification Search ................ 455/418, 455/419, 420, 432.3, 569.2; 340/426.35, 340/426.16
See application file for complete search history.

(56) References Cited

U.S. PATENT DOCUMENTS

| | | | | |
|---|---|---|---|---|
| 4,677,257 | A * | 6/1987 | Ogasawara et al. | 178/4 |
| 6,556,840 | B1 * | 4/2003 | Zicker et al. | 455/551 |
| 2003/0069028 | A1 * | 4/2003 | McCann | 455/456 |
| 2003/0130893 | A1 * | 7/2003 | Farmer | 705/14 |
| 2003/0182360 | A1 * | 9/2003 | Mocek et al. | 709/203 |
| 2005/0065779 | A1 * | 3/2005 | Odinak | 704/201 |

* cited by examiner

*Primary Examiner*—Matthew Anderson
*Assistant Examiner*—Tuan Pham
(74) *Attorney, Agent, or Firm*—Cardinal Law Group

(57) ABSTRACT

The invention presents a method for providing activation parameters for a telematic device by receiving at least one telematic device specific activation attribute from a telematic device manufacturer at a remote activation server. Additionally, the remote activation server receives at least one mobile vehicle specific attribute from a mobile vehicle manufacturer. At least one data feed attribute is created as a function of the telematic device specific activation attribute and the mobile vehicle specific attribute, and is stored within a database in communication with the remote activation server.

23 Claims, 3 Drawing Sheets

METHOD AND SYSTEM FOR TELEMATIC DEVICE ACTIVATION ATTRIBUTE FORMATION

FIELD OF THE INVENTION

In general, the invention relates to wireless communication systems. More specifically, the invention relates to telematic device communications and in particular, to a method and system for creating telematic device activation attribute information.

BACKGROUND OF THE INVENTION

Telematic communication units (TCU's), include devices such as cellular phones, personal data assistants (PDA's), Global Positioning System (GPS) devices, and on-board Vehicle Communication Units (VCU's). When used in conjunction with a Wide Area Network (WAN), such as a cellular telephone network or a satellite communication system, TCU's have made it possible for a person to send and receive voice communications, data transmissions, and facsimile (FAX) messages from virtually anywhere on earth. Such communication is initiated at the TCU when it is turned on, or by entering a phone number to be called, or in many cases, by pressing a preprogrammed button on the TCU or speaking a voice command causing the TCU to automatically complete the process of dialing the number to be called. A radio communication link may be established between the TCU and a Wide Area Network (WAN), using a node of the WAN near the TCU.

In cellular telephone systems, a node is commonly referred to as a "cellular base station." Once a radio communication link between the TCU and the cellular base station has been established, the base station may utilize a combination of additional cellular stations, conventional telephone wire line networks, and possibly even satellite systems to connect the TCU to the number to be called.

Prior to the TCU being permitted access to a communication system however, it must first be activated. Typically, TCU activation requires that activation attribute information (information specific to each telematic device) is hand keyed into each device or its associated devices by hand through the intervention of a device vendor. The activation attribute information may be provided to the vendor by retrievable data within the device, from information found on the device, and by hard copy data provided with the device. Since this information must be compiled, listed, and shipped to the vendor prior to activation, inaccurate or lost data may occur.

Some TCU's may also require activation over multiple service providers, such as a TCU used in conjunction with a wireless communication services provider and a mobile vehicle communication system (MVCS), or may require activation in communication with associated optional equipment. The mobile vehicle communication system may offer such services to the TCU user as navigation, providing location and destination information, roadside assistance, and may additionally offer aid in the motor vehicles operation. These services may be provided by Over-the-air Service Provisioning (OTASP), and are offered to the customer by the service provider using the wireless network instead of requiring the customer to bring in the TCU for reprogramming.

Additional equipment may be required to function in unison with the TCU to provide the OTASP service, and such equipment can include a mobile vehicle, a GPS, or other optional peripherals. When multiple service providers or communication systems must include each TCU's activation attributes to their system, the activation attribute information must be supplied and inserted by a vendor of each provider or system, and in a fashion that may be proprietary for each. Also if the TCU is associated with optional equipment, each device's activation attributes must be associated with the other equipments activation attributes. This causes a redundancy of data insertion as well as multiple opportunities for the accumulation of inaccurate or lost data.

Thus, there is a significant need for a method and system for optimizing the creation and collection of activation attribute information for a telematic communication unit and it's associated equipment that overcome the above disadvantages and shortcomings, as well as other disadvantages.

SUMMARY OF THE INVENTION

One aspect of the invention presents a method for providing activation parameters for a telematic device by receiving at least one telematic device specific activation attribute from a telematic device manufacturer at a remote activation server, and receiving at least one mobile vehicle specific attribute from a mobile vehicle manufacturer at the remote activation server. In addition, creating at least one data feed attribute as a function of the telematic device specific activation attribute and the mobile vehicle specific attribute, and storing the data feed attribute in a database in communication with the remote activation server.

Another aspect of the invention presents a system for providing activation parameters for a telematic device. The system includes a means for receiving at least one telematic device specific activation attribute from a telematic device manufacturer at a remote activation server, and means for receiving at least one mobile vehicle specific attribute from a mobile vehicle manufacturer at the remote activation server. Also included are means for creating at least one data feed attribute as a function of the telematic device specific activation attribute and the mobile vehicle specific attribute, and means for storing the data feed attribute in a database in communication with the remote activation server.

Another aspect of the invention provides a computer readable medium for storing a computer program. The computer program is comprised of computer readable code for receiving at least one telematic device specific activation attribute from a telematic device manufacturer at a remote activation server, and computer readable code for receiving at least one mobile vehicle specific attribute from a mobile vehicle manufacturer at the remote activation server. Additionally, computer readable code for creating at least one data feed attribute as a function of the telematic device specific activation attribute and the mobile vehicle specific attribute, and computer readable code for storing the data feed attribute in a database in communication with the remote activation server.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
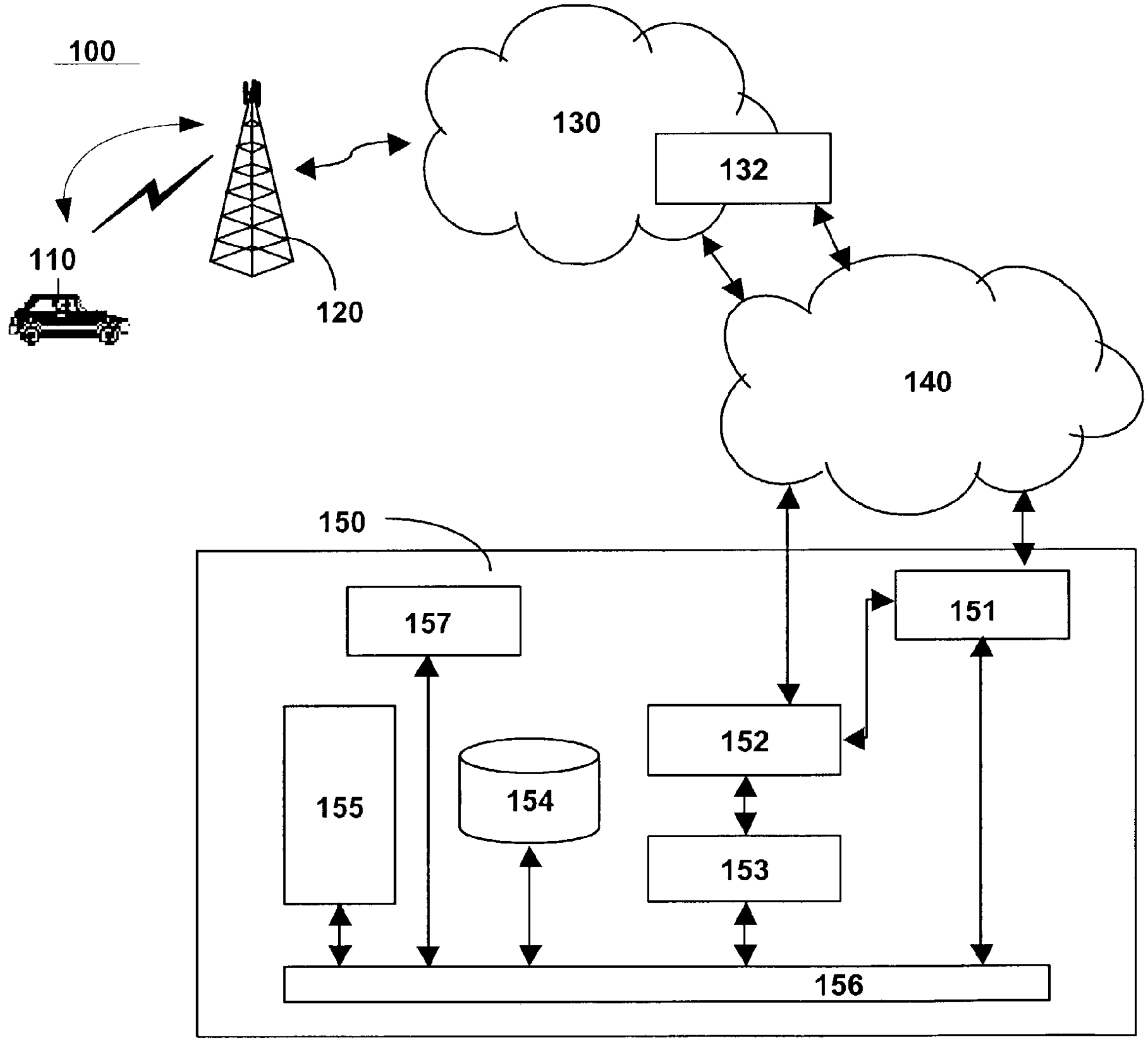
FIG. 1 is a schematic diagram for one embodiment of a system for accessing a telematic device using a wireless communication system, in accordance with the present invention.

FIG. 1 shows an illustration for one embodiment of a system for communicating with a mobile vehicle using a telematic device and a wireless communication system in accordance with the present invention, and may be referred to as a mobile vehicle communication system (MVCS) 100. The mobile vehicle communication system 100 may contain one or more mobile vehicles (mobile vehicle communication unit) 110, one or more wireless carrier systems 120, one or more communication networks 130, one or more short message service centers 132, one or more land networks 140, and one or more call centers 150. Call center 150 may contain one or more switches 151, one or more data transmission devices 152, one or more communication services managers 153, one or more communication services databases 154, one or more advisors 155, one or more bus systems 156, and one or more automated speech recognition (ASP) units 157. For one embodiment of the invention, the call center 150 may additionally contain a remote activation server and an activation database (not shown). An additional embodiment of the invention may provide the remote activation server and the activation database to be in communication with the mobile vehicle communication unit 110, the wireless carrier systems 120, and/or the communication networks 130. Further, the remote activation server and the call center may be one and the same.

Mobile vehicle 110 may contain a wireless vehicle communication device (referred to as a telematic communication unit, module, network access device (NAD), and MVCS module) such as an analog or digital phone with suitable hardware and software for transmitting and receiving data communications. Mobile vehicle 110 may contain a wireless modem for transmitting and receiving data. Mobile vehicle 110 may contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle. Mobile vehicle 110 may send to and receive radio transmissions from wireless carrier system 120. Mobile vehicle 110 may contain a speech recognition system (ASR) capable of communicating with the wireless vehicle communication device. The wireless vehicle communication device may be capable of functioning as any part of or all of the above communication devices and, for one embodiment of the invention, may be capable of data storage, and/or data retrieval, and/or receiving, processing, and transmitting data queries. Additionally, the wireless vehicle communication device may be provided with Over-the-air Service Provisioning (OTASP), which may offer to the customer additional services provided by a service provider using part or all of the mobile vehicle communication system (MVCS) 100 instead of requiring the customer to bring the TCU to a distributor for reprogramming.

Wireless carrier system 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to at least one mobile vehicle 110 or to a call center.

Communications network 130 may include one or more short message service centers 132. Short message service center 132 may prescribe alphanumeric short messages to and from mobile vehicles 110. Short message service center 132 may include message entry features, administrative controls, and message transmission capabilities. For one embodiment of the invention, the short message service center 132 may include one or more automated speech recognition (ASR) units. Short message service center 132 may store and buffer the messages. Short message services may include functional services such as paging, text messaging and message waiting notification. Short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center. In one embodiment of the invention, a communication system may reference all or part of the wireless carrier system 120, communications network 130, land network 140, and short message service center 132. Land network 140 may connect a first wireless carrier system 120 with a second wireless carrier system 120. Communication network 130 and land network 140 may connect wireless carrier system 120 to a communication node or call center 150.

Call center 150 may be a location where many calls can be received and serviced at the same time, or where many calls may be sent at the same time. The call center may be a telematic call center, prescribing communications to and from mobile vehicles 110. The call center may be a voice call center, providing verbal communications between an advisor in the call center and a subscriber in a mobile vehicle. The call center may be a voice activated call center, providing verbal communications between an ASR unit and a subscriber in a mobile vehicle. The call center may contain any of the previously described functions.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156. Switch 151 may receive from or send voice transmissions to one or more automated speech recognition (ASR) units 157 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, one or more automated speech recognition (ASR) units 157, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Communication services manager 153 may send a short message service request to mobile vehicle 110. Communication services manager 153 may receive from or send voice transmissions to one or more automated speech recognition (ASR) units 157.

In another embodiment of the invention, short message service (SMS) communications may be sent and received according to established protocols such as IS-637 standards for SMS, IS-136 air interface standards for SMS, and GSM 03.40 and 09.02 standards. These protocols allow for example, short messages comprised of up to 160 alphanumeric characters and may contain no images or graphics. Similar to paging, an SMS communication may be posted along with an intended recipient, such as a communication device in mobile vehicle 110. The SMS communication may be sent by a communication services manager in a call center, transferred to a short message service center (SMSC), and conveyed to the intended recipient. In one embodiment of the invention, mobile vehicle 110 may receive an SMS message when the ignition is on, or when put into an SMS-ready or service-ready mode while the ignition is off. The mobile vehicle 110 may be placed in a powered down or quiescent mode while the ignition is off. When the mobile vehicle is placed into a service ready mode, the telematic communication unit (TCU) in the mobile vehicle may register with a local wireless carrier if needed, or with the subscriber's home system if the mobile vehicle is not roaming. If an SMS message is waiting to be sent, the wireless carrier may deliver the message and the TCU may acknowledge receipt of the message by an acknowledgment to the SMSC. Mobile vehicle 110 may perform an operation in response to the SMS message, and may send an SMS reply message back to the call center. Similarly, another embodiment of the mobile vehicle 110 may originate an SMS message to the call center through the SMSC.

In one embodiment of the invention, the communication services manager 153 may determine whether an SMS communication should be sent to mobile vehicle 110. An SMS message may be initiated in response to a subscriber request, such as a request to unlock the vehicle doors. An SMS message may be sent automatically, for example, when an update or vehicle preset value is desired or when a diagnostic message is needed. In another embodiment of the invention, a SMS message may be sent to periodically check the location and status of mobile vehicle 110, and for another embodiment of the invention, to request data collection, data retrieval, and/or data submission from mobile vehicle 110. Communication services manager 153 may also provide further requests and determinations based on a reply from mobile vehicle 110. Communication services manager 153 may provide information to mobile vehicle 110 from communication services database 154.

Communication services database 154 may contain records on one or more mobile vehicles 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile vehicle 110. Communication services database 154 may provide information and other support to communication services manager 153 and automated speech recognition (ASR) units 157, and in one embodiment of the invention to OTASP service providers (optional services providers). OTASP service providers can offer for example, vehicle repair services, rental services, marketing services, etc., and may be in affiliation with agencies, marketing firms and manufacturers outside of the previously described MVCS 100. The communication services database 154 may additionally provide for the storage and retrieval of TCU device specific activation information. Another embodiment of the invention may require external services to be authorized, such as having a multi-use license, or pre-approved such as for a one-time use.

Another embodiment of the invention may provide that communication services database 154 include geographic and/or mapping information that may include geographic features such as lakes, mountains, businesses, cities, malls, and any other feature that may be identifiable with a given location. The communication services database 154 may also include points of interest that can be spatially enabled, such as golf courses, rest areas, and historical markers.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153, automated speech recognition (ASR) units 157, or any other device connected to bus system 156. Another embodiment of the invention may allow for the advisor 155 and ASR units 157 to be integrated as a single unit capable of any features described for either.

Figure 2:
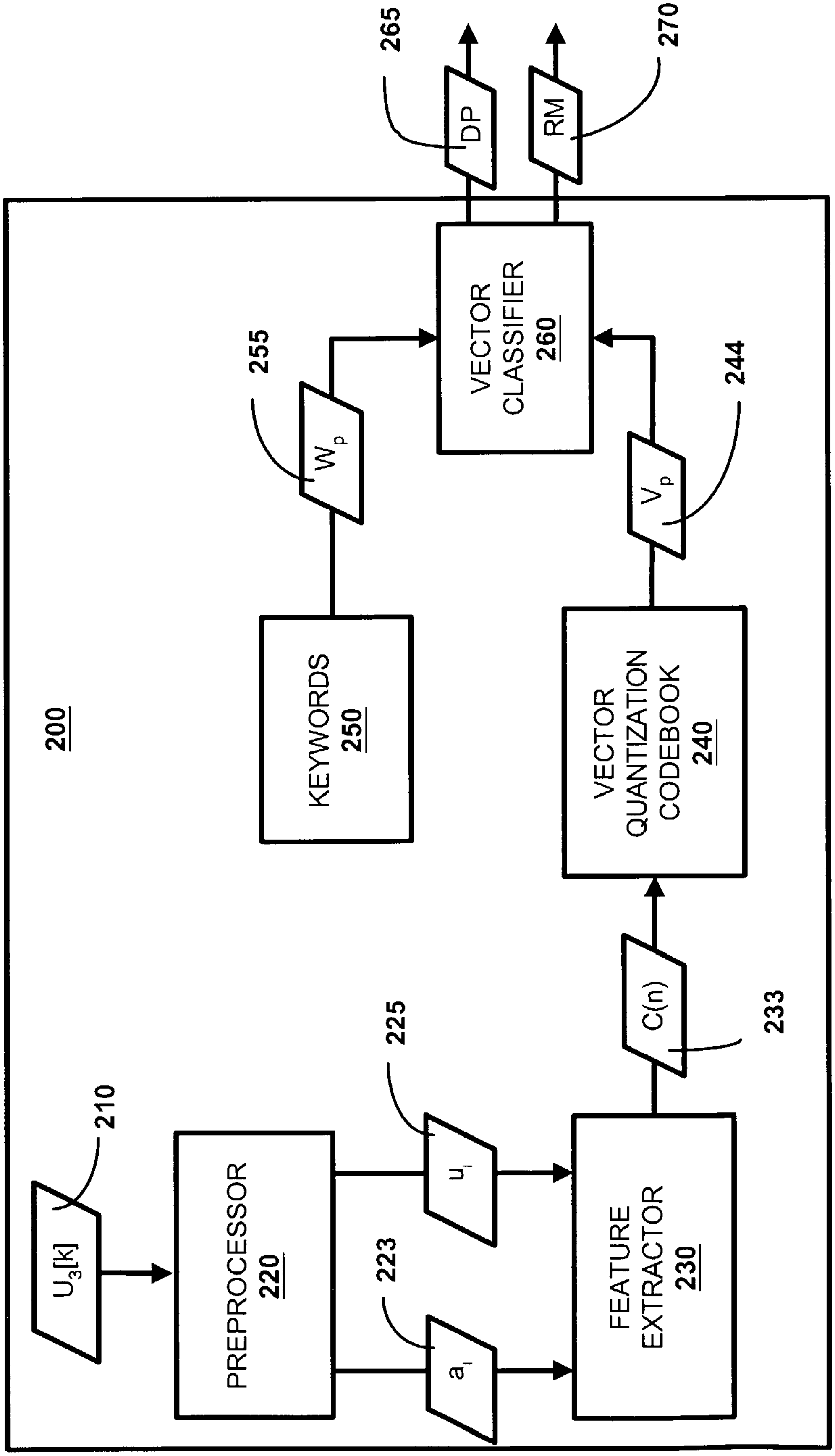
FIG. 2 is a schematic diagram for one embodiment of a voice recognition system compatible with the system of FIG. 1, in accordance with the present invention.

FIG. 2 illustrates one embodiment of an ASR unit 200 for ascertaining the acceptability of a spectral vector $V_p$. A preprocessor 220 may receive a speech signal $U_3[k]$ 210 and in response, provide a set of pole-zero coefficients $a_i$ 223 and $u_i$ 225. The preprocessor 220 may use the assumption that the speech signal $U_3[k]$ 210 is a linear combination of L previous samples. In one embodiment of the invention, the $a_i$ 223 coefficients may be the resulting predictor coefficients, which may be chosen to minimize a mean square filter prediction error signal e[k] summed over an analysis window. Another embodiment of the invention may provide the preprocessor 220 to transform the speech signal $U_3[k]$ 210 into a representation of a corresponding spectral signal $U_3(z)$.

A feature extractor 230 may receive pole-zero coefficients $a_i$ 223 and $u_i$ 225, and in response thereto, provide a set of cepstral coefficients C(n) 233 representative of a spectral parameters corresponding to speech signal $U_3[k]$ 210.

A vector codebook 240 may receive cepstral coefficients C(n) 233 and conventionally provide spectral vector $V_p$ 244. In one embodiment of the invention, vector codebook 240 may conventionally transform the cepstral coefficients C(n) 233 to the spectral vector $V_p$ 244.

A vector classifier 260 may receive the spectral vector $V_p$ 244 as well as keyword $W_p$ 255 from a keywords module 250. It may be assumed that the dimension of the spectral vector $V_P$ 244 and keyword $W_P$ 255 is m. Another embodiment of the invention may respond that the vector classifier 260 provide either the data packet DP 265 or the rejection message RM 270. Additionally, the keywords module 250 can be designed to produce voice recognition topics, which may be a group of words, pronunciations, and corresponding word usage statistics (language modeling), created for a specific subject, such as interstate travel, and vehicle user preferences (presets).

ASR unit 200 may consist of digital and/or analog hardware, software, or a combination of hardware and software. In alternative embodiments, ASR unit 200 may be incorporated within a wireless network, a wireline network, a filtering system, or distributed among a transceiver, a wireless network, a wireline network and/or a filtering system. The ASR unit 200 may be an OTASP capable telematic communication device or in communication with an OTASP capable telematic communication device.

To properly activate and operate the ASR unit 200 (device) within one embodiment of the invention, a call center must have an account for the device. Each account may be stored in an activation database in communication with the call center, and may include attributes proprietary to each device. Example attributes may include an identifier of the device, an electronic serial number of an associated TCU, an authentication code of the device, a mobile identification number of the TCU, or a vehicle identification number of a mobile vehicle into which the ASR unit 200 is to be installed. Another embodiment of the invention may require additional information relative to the individual determination of each device listed in the activation database.

The above mentioned attribute information may originate from independent sources, but all attribute information must be received and correlated in the activation database prior to activation of the device. The complete device specific activation attribute information within the activation database is for one embodiment of the invention, a requirement prior to a final production part approval for the device. The device may not be installed into a vehicle until this information is approved.

Figure 3:
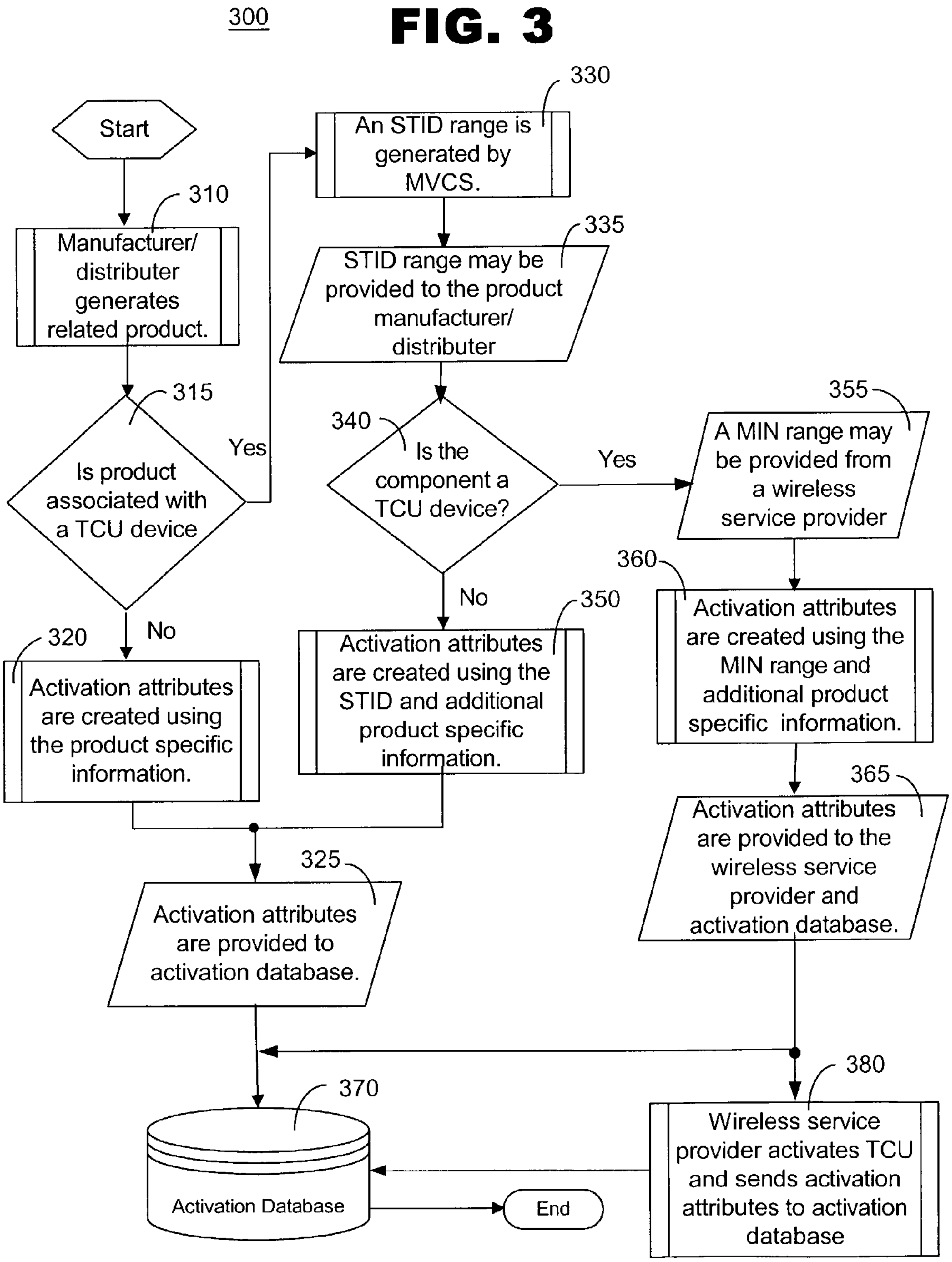
FIG. 3 is a flow chart representation for one embodiment of a telematic device activation attribute selection method utilizing the systems of FIG. 1 and FIG. 2, in accordance with the present invention.

A further embodiment of the invention is illustrated in FIG. 3 as a flowchart of a method for creating and storing a telematic device activation attribute (attribute) 300. The following descriptive information is prerequisite for one embodiment of the invention.

For each device, all attribute information relative to the device may not only be entered into the activation database, but may be interconnected to create a unique account for each device. The creation of the unique account and any interconnections may be provided within the call center, remote activation server, or activation database. These interconnections may be reduced to a series of pairings to generate the unique account (data feed attributes). For example, the activation database may receive for a device, the following attribute information. A station ID (STID), an authorization code (AUTH), an electronic serial number (ESN), a mobile ID (MIN), a vehicle ID (VIN), and/or a vehicle color (VC). Correlating the attribute information by making the following or similar pairings may be used for one embodiment of the invention to create each devices unique account:

STID←→AUTH
MIN←→ESN
VIN←→VC
STID←→ESN
STID←→VIN

The attribute information required for each activation account within the activation database may be provided by multiple sources, for instance; The STID may be defined by a device supplier, the ESN may be defined by a TCU device supplier, and the VIN may be defined by a vehicle manufacturer.

In another embodiment of the invention, each attribute may have a predetermined format. An attribute format may include a valid range, length or electronic format. For instance, the auth code for one embodiment must be four bytes of random numbers, and/or the STID may be 10 digits between 6000000 and 8000000. Upon receipt by the activation database of each attribute from its source, the attribute (data) may be verified against its predefined format.

If attribute information is supplied to both the activation database and an optional services provider, a wireless service provider, a manufacturer, or any other type of third party, that third party must relay all associated device attribute information they collect or create, back to the activation database so that the database may contain a copy of all associated and operational attribute information for each device. For example, a TCU device's MIN/ESN pair may be sent to a wireless phone company so the device attributes can be loaded into the phone companies home location register. This is necessary for the operation of the TCU to perform as a network access device (NAD). Therefore, the activation database must be populated using the attribute information received by and programmed by the wireless phone company. For one embodiment of the invention, the NAD may be a module installed within an OTASP device, thus allowing the OTASP device to access a wireless network.

Referencing again the method for creating and storing a telematic device activation attribute (attribute) 300, one embodiment of the flowchart may depict a method using closed loop data transfers, which require the recipient (activation database) to verify and confirm that the data (attribute information) is valid as defined by any predetermined format. This type of data transfer may be assumed for the remainder of the flowchart description.

For the introduction of a device to be provided to an activation database, a manufacturer or distributor (source) of the device may accumulate related attribute information 310 for each device offered for implementation into the MVCS. If the product is nor a TCU or a TCU peripheral 315, activation attributes may be created using device specific information 320. An example device may be a mobile vehicle after its manufacture bin before introduction to a TCU related device. The attribute information may include the VIN and VC, and any additional device (mobile vehicle) specific information. The accumulated attribute information may be provided as activation attributes 325 to the activation database 370. As previously mentioned, the activation database may in all cases deny and return activation attributes that do nor fall within predefined parameters.

If a device is a TCL or a TCU peripheral 315, the MVCS may assign an authorized STID range 330 to the manufacturer or distributor of the device 335 to be used for all like devices. After being provided the STID range, it as determined if the device is a TCU 340. When determined that the device is not a TCU, but is a peripheral or device associated with a TCU, the activation attributes of the device may be created including an STID from the range assigned 350. The now product specific STID and additional activation attributes may be provided by the manufacturer or distributor 325, to the activation database 370.

If the device had been determined to be a TCU 340, a wireless service provider may assign a MIN range to the manufacturer or distributor of the device 355, to be used for all like devices. Activation attributes may be created for a specific TCU device as a function of an assigned MIN within the provided range, as well as other device specific attributes 360. The compiled activation attributes may be provided to the wireless service provider 365 as well as the activation database 370, by the manufacturer or distributor of the device. The method may be completed when the wireless service provider sends all devices specific activation attributes it has collected 380, to the database 370. The activation database may correlate and compile the activation information for each TCU, peripheral, and mobile vehicle in a manner as previously described.

The above-described methods and implementation for creating and storing telematic device activation attribute information and associated information are example methods and implementations. These methods and implementations illustrate one possible approach for ascertaining the activation information for a TCU, peripheral, and/or mobile vehicle, and their associated information. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for providing activation parameters for a telematic device comprising:

receiving at least one telematic device specific activation attribute from a telematic device manufacturer at a remote activation server;

receiving at least one mobile vehicle specific attribute from a mobile vehicle source at the remote activation server;

creating at least one data feed attribute as a function of the telematic device specific activation attribute and the mobile vehicle specific attribute; and storing the data feed attribute in a database in communication with the remote activation server.

2. The method of claim 1 wherein the telematic device is capable of over-the-air service provisioning.

3. The method of claim 1 further comprising comparing the data feed attribute to a predetermined format.

4. The method of claim 1 further comprising receiving at least one telematic device specific activation attribute from a optional services provider at the remote activation server.

5. The method of claim 1 further comprising receiving at least one telematic device specific peripheral activation attribute from a telematic device peripheral manufacturer at a remote activation server.

6. The method of claim 5 further comprising creating at least one data feed attribute as a function of the telematic device specific activation attribute, the telematic device specific peripheral activation attribute, and the mobile vehicle specific attribute.

7. The method of claim 5 further comprising creating at least one data feed attribute as a function of the telematic device specific peripheral activation attribute, and the mobile vehicle specific attribute.

8. The method of claim 5 further comprising creating at least one data feed attribute as a function of the telematic device specific activation attribute, and the telematic device specific peripheral activation attribute.

9. The method of claim 1 wherein creating at least one data feed attribute comprises receiving and correlating the telematic device specific activation attribute and the mobile vehicle specific attribute prior to activation of the telematic device.

10. A system for providing activation parameters for a telematic device comprising:

means for receiving at least one telematic device specific activation attribute from a telematic device manufacturer at a remote activation server;

means for receiving at least one mobile vehicle specific attribute from a mobile vehicle manufacturer at the remote activation server, means fur creating at least one data feed attribute as a function of the telematic device specific activation attribute and the mobile vehicle specific attribute; and means for storing the data feed attribute in a database in communication with the remote activation server.

11. The system of claim 10 further comprising means for comparing the data feed attribute to a predetermined format.

12. The system of claim 10 further comprising means for receiving at least one telematic device specific activation attribute from a optional services provider at the remote activation server.

13. The system of claim 10 further comprising means for receiving at least one telematic device specific peripheral activation attribute from a telematic device peripheral manufacturer at a remote activation server.

14. The system of claim 13 further comprising means for creating at least one data feed attribute as a function of the telematic device specific activation attribute, the telematic device specific peripheral activation attribute, and the mobile vehicle specific attribute.

15. The system of claim 13 further comprising means for creating at least one data feed attribute as a function of the telematic device specific peripheral activation attribute, and the mobile vehicle specific attribute.

16. The system of claim 13 further comprising means for creating at least one data feed attribute as a function of the telematic device specific activation attribute, and the telematic device specific peripheral activation attribute.

17. A computer readable medium storing a computer program for providing activation parameters for a telematic device comprising:

computer readable code for receiving at least one telematic device specific activation attribute from a telematic device manufacturer at a remote activation server;

computer readable code far receiving at least one mobile vehicle specific attribute from a mobile vehicle manufacturer at the remote activation server;

computer readable code far creating at least one data feed attribute as a function of the telematic device specific activation attribute and the mobile vehicle specific attribute; and computer readable code far storing the data feed attribute in a database in communication with the remote activation server.

18. The computer program of claim 17 further comprising computer readable code for comparing the data feed attribute to a predetermined format.

19. The computer program of claim 17 further comprising computer readable code for receiving at least one telematic device specific activation attribute from a optional services provider at the remote activation server.

20. The computer program of claim 17 further comprising computer readable code for receiving at least one telematic device specific peripheral activation attribute from a telematic device peripheral manufacturer at a remote activation server.

21. The computer program of claim 20 further comprising computer readable code for creating at least one data feed attribute as a function of the telematic device specific activation attribute, the telematic device specific peripheral activation attribute, and the mobile vehicle specific attribute.

22. The computer program of claim 20 further comprising computer readable code for creating at least one data feed attribute as a function of the telematic device specific peripheral activation attribute, and the mobile vehicle specific attribute.

23. The computer program of claim 20 further comprising computer readable code for creating at least one data feed attribute as a function of the telematic device specific activation attribute, and the telematic device specific peripheral activation attribute.

* * * * *